W. H. GUENIN.
TANK HEATER.
APPLICATION FILED FEB. 21, 1919.
1,389,653.
Patented Sept. 6, 1921.
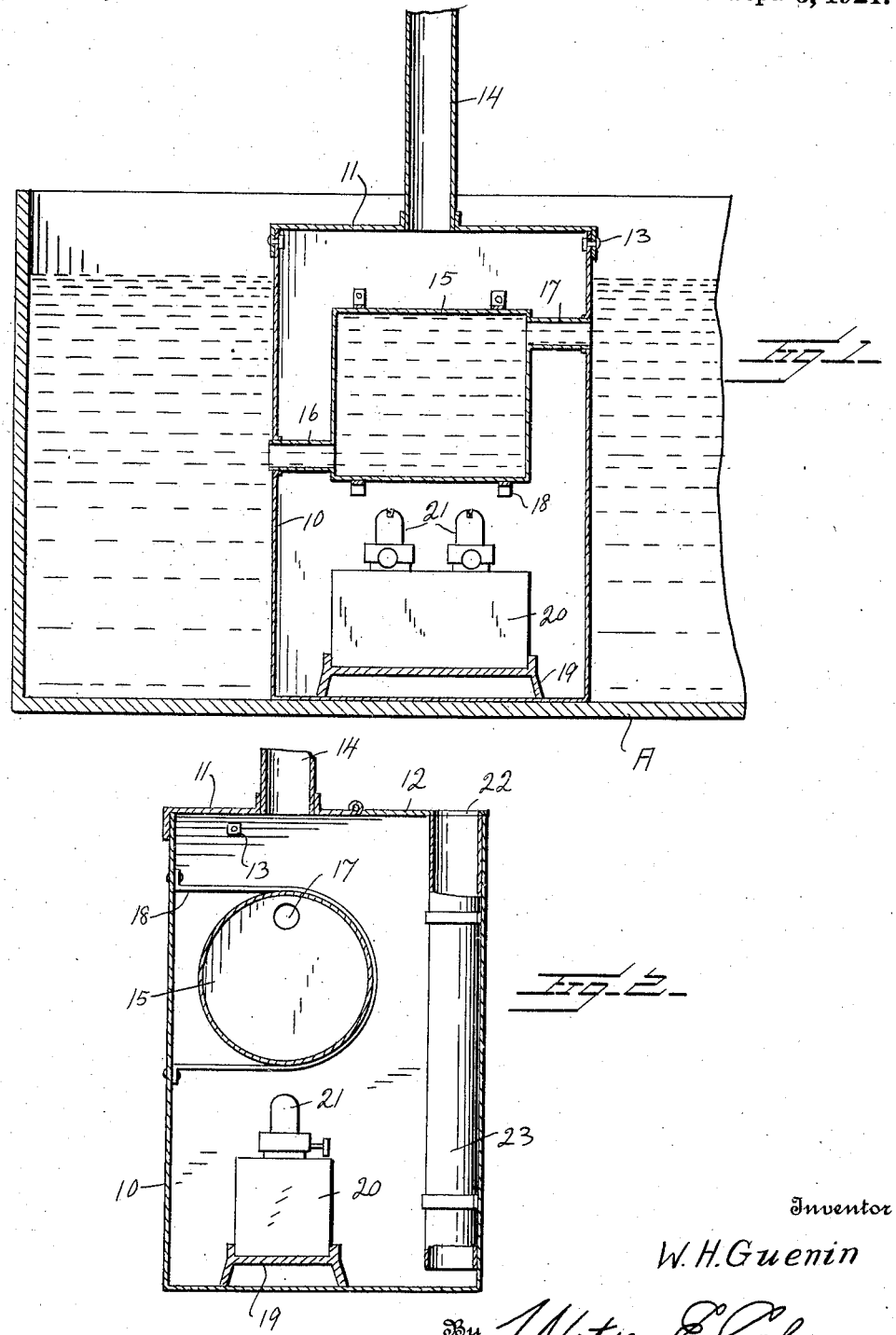
Inventor
W. H. Guenin
By Watson E. Coleman
Attorney

UNITED STATES PATENT OFFICE.

WALTER H. GUENIN, OF LEWELLEN, NEBRASKA.

TANK-HEATER.

1,389,653.

Specification of Letters Patent.   Patented Sept. 6, 1921.

Application filed February 21, 1919.   Serial No. 278,358.

*To all whom it may concern:*

Be it known that I, WALTER H. GUENIN, a citizen of the United States, residing at Lewellen, in the county of Garden and State of Nebraska, have invented certain new and useful Improvements in Tank-Heaters, of which the following is a specification, reference being had to the accompanying drawings.

This invention relates to water heating appliances, and particularly to that character of appliance wherein an oil burner is used for heating water in a circulating system.

The general object of my invention is to provide a very simple and cheaply manufactured device for this purpose including a casing inclosing the water heating chamber or reservoir connected to a circulating system, and a lamp whereby the water within the reservoir may be heated.

A further object is to provide a construction of this character including a housing or casing wherein is disposed the lamp and the water heating reservoir and from which extends the water pipes, the casing being provided with an air inlet to furnish sufficient air to provide for the combustion of the fuel, and being provided with an outlet for carrying off the products of combustion, the top of the casing being detachably engaged with the body of the casing and being formed so that a portion of it may be lifted up whereby access may be had to the interior of the casing.

Other objects will appear in the course of the following description.

My invention is illustrated in the accompanying drawings, wherein:—

Figure 1 is a vertical sectional view of a tank with my improved heater applied therein; and Fig. 2 is a vertical sectional view of the heater, the section being at right angles to that in Fig. 1.

Referring to these drawings, 10 designates a casing which may be made of sheet metal or any other material. The top of this casing is formed by a lid 11. This lid 11 is formed in two sections, the section 12 being hinged to the body of the lid so that it may be lifted up. This lid is formed with downwardly extending flanges on three sides, these flanges being connected to the casing 10 by bolts 13. Extending upward from the lid is the pipe 14 carrying off the products of combustion.

Disposed within the casing 10 is a water reservoir or chamber 15 which is likewise made of sheet metal or other suitable material of like character, and entering the casing 10 and discharging into the bottom of the reservoir 15 is a water inlet pipe 16, and extending from the upper portion of the reservoir and through the side wall of the casing 10 is an outlet pipe 17. These inlet and outlet pipes may be connected to the pipe of a water circulating system if desired, and it will be understood that these pipes are to be provided with suitable valves for controlling the flow of water or other liquid through the pipes and heating chamber. The heating chamber 15 is supported by means of a bracket 18.

Disposed in the bottom of the casing 10 is a strap iron frame 19 upon which is mounted the oil font 20 having burners 21. The lid of the casing is formed with an opening 22, and attached to the wall of the casing and extending downward from this opening nearly to the bottom of the casing is an air inlet pipe 23 which discharges fresh air at the bottom of the casing to thereby promote the combustion of the fuel.

Preferably this heater is to be used for heating the water in a tank or other vessel, and I have illustrated such use in Fig. 1, wherein the heater is disposed within a tank A and wherein the hot water contained within the reservoir 15 passes out through the pipe 17, while the cooled water flows in through the pipe 16, thus securing a circulation. Thus, the water in the tank is heated not only by passing through the water reservoir 15, but also by contact with the heated walls of the casing 10.

The utility and operation of this device will be obvious. It affords very convenient means whereby water may be heated, and I have found in practice that but little oil is required in order to keep the water hot. Of course, it is obvious that it may be made in all sizes and that the details of construction may be changed in many ways without departing from the spirit of the invention.

I claim:—

1. A tank heater of the character described including a casing, a closure normally closing the upper portion of the casing and formed of two sections hinged to each other, the closure as a whole being detachably engaged with the casing, one of said sections forming a lid adapted to be oscillated in a vertical plane, said lid section carrying an outlet pipe, the other section being formed with an air inlet opening, an air pipe attached to the wall of the casing and extending downward from said air inlet opening and discharging adjacent the bottom of the casing, a burner disposed within the casing, and a water tank disposed above the burner and between the burner and the lid and supported within the casing in spaced relation at all points to the casing, the tank having an inlet pipe extending from the exterior of the casing into the bottom of the tank, and an outlet pipe extending from the top of the tank and opening upon the exterior of the casing whereby said heater may be disposed within a water container and the circulation of water produced through said tank by the heating of the water in the tank.

2. The combination with a water container, of a water heating device therefor comprising a casing having a height less than that of the container and adapted to be disposed in the container with the upper end of the casing above the water line of the container, the upper end of the container having a cover formed in two sections hinged to each other whereby one of said sections may be lifted, an outlet pipe for the products of combustion extending from said last named section, the other section being formed with an air inlet opening, an air pipe attached to the wall of the casing and extending downward from said air inlet opening to the bottom of the casing and discharging adjacent the bottom of the casing, a burner disposed within the casing, and a water tank disposed above the burner between the burner and the outlet pipe and supported in the casing in spaced relation to the walls thereof, said tank having an inlet pipe extending from the exterior of the casing to the bottom of the tank, and an outlet pipe extending from the top of the tank to the exterior of the casing whereby the water in the container may be heated by contact with the wall of the casing and may circulate through said tank.

In testimony whereof I hereunto affix my signature in the presence of two witnesses.

WALTER H. GUENIN.

Witnesses:
R. L. SHERMAN,
I. A. SPILLMAN.